United States Patent [19]
Patel

[11] Patent Number: 5,707,939
[45] Date of Patent: Jan. 13, 1998

[54] SILICONE OIL-BASED DRILLING FLUIDS

[75] Inventor: Arvind D. Patel, Houston, Tex.

[73] Assignee: M-I Drilling Fluids, Houston, Tex.

[21] Appl. No.: 531,706

[22] Filed: Sep. 21, 1995

[51] Int. Cl.$^6$ ............................................. C09K 7/00
[52] U.S. Cl. ............................... 507/127; 507/234
[58] Field of Search .................................. 507/127, 234

[56] References Cited

U.S. PATENT DOCUMENTS

| | | | |
|---|---|---|---|
| 2,862,881 | 12/1958 | Reddie et al. | 507/135 |
| 2,994,660 | 8/1961 | Reddie et al. | 507/131 |
| 3,259,574 | 7/1966 | Morrison et al. | 252/309 X |
| 3,346,489 | 10/1967 | Dickson et al. | 507/129 |
| 3,347,789 | 10/1967 | Dickson et al. | 166/305.1 |
| 3,378,074 | 4/1968 | Kiel et al. | 166/308 |
| 4,208,285 | 6/1980 | Sample, Jr. | 210/180 |
| 4,381,241 | 4/1983 | Romenesko et al. | 507/127 |
| 4,387,514 | 6/1983 | McCaskill, Jr. | 34/368 |
| 4,421,656 | 12/1983 | Donatelli et al. | 507/127 |
| 4,876,017 | 10/1989 | Trahan et al. | 507/118 |
| 5,045,219 | 9/1991 | Trahan et al. | 507/103 |
| 5,189,012 | 2/1993 | Patel et al. | 507/103 |
| 5,432,152 | 7/1995 | Dawson et al. | 507/103 |

*Primary Examiner*—Sharon Gibson
*Assistant Examiner*—Valerie Fee
*Attorney, Agent, or Firm*—Arnold, White & Durkee

[57] ABSTRACT

The present invention relates to an improved continuous phase for a drilling fluid and specifically a silicone continuous phase which is non-polluting and substantially non-toxic. Preferred silicones for use in the invention are dimethylsiloxane polymers. In the drilling fluid compositions, suitable emulsifiers, wetting agents, viscosifiers, weight materials and fluid loss additives may be added in conjunction with water and/or a brine phase for desired rheological properties.

18 Claims, No Drawings

SILICONE OIL-BASED DRILLING FLUIDS

BACKGROUND OF THE INVENTION

This invention relates to improved drilling fluids used in the drilling of subterranean oil and gas wells as well as in other drilling fluid applications and drilling procedures. The invention is particularly concerned with non-polluting and substantially non-toxic drilling fluids. Such drilling fluids are sometimes referred to as being "environmentally compatible."

Drilling fluid (also called "drilling mud" or simply "mud") performs a variety of functions in rotary drilling. It carries cuttings from beneath the rotary bit, transports them up the annulus, and permits their separation at the surface, while cooling and cleaning the rotary bit at the same time. It reduces friction between the drill string and the sides of the borehole and maintains stability of uncased sections of the borehole. By forming a thin, low permeability filter cake which seals pores and other openings in the formations penetrated by the drill bit, drilling fluid also prevents unwanted influxes of formation fluids into the borehole from permeable rocks penetrated during drilling. Additionally drilling fluids aid in the collection and interpretation of information from drill cuttings, cores, and electrical logs.

Drilling fluids are typically classified according to their base material. In water based muds, solid particles are suspended in water or brine. Oil can be emulsified in the water, but the water is the continuous phase. Oil based muds are exactly the opposite. Solid particles are suspended in oil, water or brine is emulsified in the oil, and oil is the continuous phase. A third class of drilling fluids are pneumatic fluids in which drill cuttings are removed by a high velocity stream of air or natural gas. Oil based muds will be the focus of this patent application.

Water based drilling fluids are commonly used in drilling oil and gas wells. However, oil based drilling fluids have some advantages that make them especially desirable for drilling certain types of formations. For example, oil based muds generally have higher boiling points and lower freezing points than water based muds, and hence provide better performance in very hot or very cold environments. Oil based muds cause fewer problems when drilling hydrophilic shale formations and allow drilling of salt zones with minimal leaching of salt. Additionally, oil based muds allow recovery of cores in an in-situ condition, and in the presence of hydrous clays and bentonites, with less or no swelling or sloughing that can reduce porosities and cause pipe sticking difficulties. However, greater costs and potential pollution problems or environmental incompatibilities typically associated with oil based muds has historically limited their use to situations where they are absolutely necessary.

Use of an oil based drilling fluid results in the drill cuttings, ordinarily containing moisture, being coated with an adherent film or layer of oily drilling fluid which may penetrate into the interior of each cutting. Such coating occurs despite the use of various vibrating screens, mechanical separation devices and various washing techniques. Because of possible pollution to the environment (such as may be caused by the oily coating leaching into the environment), whether on water or on land, the cuttings cannot be properly discarded until the potential pollutants have been removed.

Problems associated with the environmental incompatibility of drill cuttings and the chemicals contained therein have long been recognized by the oil and gas exploration industry. Typically the approaches for solving the environmental problems have involved the physical treatment of the drill cuttings, see for example U.S. Pat. No. 4,208,285 wherein an apparatus is provided for removing volatile materials from drill cuttings by vaporizing the materials on the cuttings in a non-oxidative atmosphere; and U.S. Pat. No. 4,387,514 which provides a method and apparatus for drying oil well drill cuttings to eliminate pollution-causing organic materials from the cuttings. Recently, there has been an effort to find non-toxic oils that are useful as drilling fluids, see U.S. Pat. No. 5,189,012 disclosing a substantially non-toxic oil based synthetic hydrocarbon drilling fluid. However, there continues to be a need for more drilling fluids with the advantages of an oil based fluid without environmental incompatibility problems.

It is apparent to anyone selecting or using a drilling fluid for oil and gas exploration that an essential component of a selected fluid is that it be properly balanced to achieve the necessary characteristics for the specific end application. As stated hereinabove, the typical compositions include oil based muds, water based muds and pneumatic fluids. For purposes of this application, only oil and water based mud systems will be relevant. The vast majority of oil and gas exploration is done with water based muds. The primary reason for this preference is price and environmental compatibility. Oil based muds, while being substantially more expensive than water based drilling fluids, are likewise environmentally incompatible. As a result, the use of oil based muds has been historically limited to those situations where they are necessary.

This long felt need in the oil and gas exploration industry for an environmentally acceptable drilling fluid which either is an oil based drilling fluid or performs as an oil based drilling fluid has now been achieved by applicants' invention. By use of applicants' invention the functional characteristics of an oil based drilling system are achieved while the environmental compatibility of conventional water based systems is attained. Such a result has until recently been thought theoretically and practically impossible.

Various advantages of using oil based drilling mud in the rotary drilling of boreholes in the earth have been known for some time. In summary, it can be said that under certain conditions, one or more of the following advantages make oil based muds more desirable than water based muds. Lubricity characteristics are excellent. Drilling fluid weighing less than about 8 pounds per gallon can be prepared with an oil based mud, and have proved advantageous in certain special drilling and coting situations. The penetration of the formation by water is avoided. Cores can be recovered in an in situ condition, and in the presence of hydrous clays and bentonites, no swelling or sloughing is experienced to reduce porosities or cause pipe sticking difficulties. There are fewer problems with hydrophilic shale formations drilled. Evaporite sections such as salt zones can be drilled with minimal leaching of the salt. Furthermore, oil based muds can be formulated to withstand temperatures up to 500 degrees Fahrenheit.

The principal difficulties encountered in the use of oil based drilling fluids are probably those of handling, fire hazard, environmental unacceptability and the intrinsic cost per barrel, since oil is much more expensive than water. However, oil based muds offer potential advantages; better lubricating qualities, higher boiling points, and lower freeze points. Because the cost of preparing an oil mud is always more than that of the same density water muds, the economic justification for selecting an oil mud must come from its superior performance under the particular conditions of use.

There is strong sentiment that although the initial differential cost of oil based muds versus aqueous based muds favors aqueous based, as the well is drilled deeper and as drilling operations last longer, the oil based muds actually become more economical due to the fact that the constituents do not have to be replenished as often and the fact that the oil based muds are reusable.

As can be seen from the above, the development of a drilling fluid that exhibits desirable characteristics of both a water based and oil based drilling fluid has long been an unachieved goal of the oil and gas exploration industry. With the practice of applicants' invention this goal has been realized.

SUMMARY OF THE INVENTION

The present invention relates to an essentially non-polluting, substantially non-toxic drilling fluid comprising silicone as the base liquid. The silicone will form the continuous phase of an invert emulsion, preferably with water or brine forming the internal phase. Examples of silicones believed to be useful in the practice of this invention include dimethylsiloxane polymers, also called dimethyl silicone fluids, having low viscosity (such as about 2.0 centistokes at 25° Centigrade) to medium viscosity (about 1,000 centistokes at 25° Centigrade). These dimethylsiloxanes for use in this invention may be cyclic or straight chain and have the general formula $-((CH_3)_2SiO_2)_x-$ where x is a number in the range of about 2 to several hundred.

The present invention relates to minimally, toxic, or substantially non-toxic, essentially non-polluting, silicone-based drilling fluids which are functionally capable of carrying out additional wellbore functions such as those performed by a spotting fluid, packer-fluid, completion fluid, workover fluid and coring fluid. As used herein, the term "drilling fluid" shall be understood to encompass all of these functions, unless specifically noted otherwise.

The base liquid in the drilling fluids of this invention is silicone. An invert emulsion with silicone as the continuous phase and water or brine as the internal phase is created. Preferably, silicone will comprise at least about 25 percent of the volume of the emulsion. Preferred silicones for use in this invention include dimethylsiloxane polymers, also called dimethyl silicone fluids, having the general formula, $(-(CH_3)_2-SiO_2)_x$, cyclic or straight chain, where x is a number in the range of about 2 to several hundred. The viscosity of such dimethyl silicones ranges from about 2.0 centistokes (cSt), considered a low viscosity, to about 1,000 (cSt), considered a medium viscosity, at 25° Centigrade.

The drilling fluid compositions of the present invention can be modified according to the end use of the fluid using suitable emulsifiers, wetting agents, viscosifiers, suspending agents, density or weight materials, and fluid loss control agents. Such additives should preferably be non-toxic or added in non-toxic amounts so as not to render the drilling fluid, as a whole, toxic.

Emulsifiers are chemical compounds which have both oleophilic and hydrophilic parts. They may aid the incorporation of the brine or water phase into the silicone continuous phase. Examples of emulsifiers suitable for use in this invention include fatty acids, soaps of fatty acids, arid fatty acid derivatives, including amido-amines, polyamides, polyamines, esters (such as sorbitan monoleate polyethoxylate and sorbitan dioleate polyethoxylate), imidazolines, alcohols, polyalkylene oxide modified dimethylsiloxanes, and combinations or blends of these. Versacoal® and Versacoat® NS are examples of commercially available emulsifiers manufactured and distributed by M-I Drilling Fluids L.L.C. that may be used in this invention. A series of Silwet® surfactants are examples of commercially available polyalkylene oxide modified dimethylsiloxanes manufactured and distributed by Union Carbide Chemicals Company Inc. that may be used in this invention.

Examples of wetting agents suitable for use in this invention include fatty acids, crude tall oil, oxidized crude tall oil, suffactants, organic phosphate esters, modified imidazolines and amidoamines, alkyl aromatic sulfates and sulfonates, and the like, and combinations or derivatives of these. Versawet® and Versawet® NS are examples of commercially available wetting agents manufactured and distributed by M-I Drilling Fluids L.L.C. that may be used in this invention. Silwet L-77, L-7001, L7605 and L-7622 are examples of commercially available surfactants and wetting agents manufactured and distributed by Union Carbide Chemical Company Inc.

Examples of viscosifiers and suspending agents suitable for use in this invention include organophilic clays, amine treated clays, oil soluble polymers, polyamide resins, polycarboxylic acids, and soaps. The amount of viscosifier used in the composition, if any, may vary depending upon the end use of the composition. However, normally about 0.1 percent to about 10 percent by weight is sufficient for most applications. VG-69 is an organoclay material and Versa HRP™ is a polyamide resin product distributed by M-I Drilling Fluids L.L.C. that may be used in this invention.

Examples of weight or density materials suitable for use in this invention include barite, galena, iron oxides, siderite, calcium carbonate, and the like. The quantity of such material added, if any, depends upon the desired density of the final composition. Typically, weight material is added to result in a drilling fluid density of up to about 24 pounds per gallon.

Examples of fluid loss control agents suitable for use in this invention include modified lignites, asphaltic compounds, organophilic humates prepared by reacting humic acid with amides or polyalkylene polyamines, and other non-toxic fluid loss additives. These loss-preventing agents typically act by coating the walls of the borehole as the well is being drilled.

It is, of course, to be understood that other, non-toxic additives, known in the well drilling art for imparting specially required properties to drilling fluids, may also or alternatively be added to the silicone-based drilling fluids of the present invention as the need arises. The omission of any discussion herein concerning such other additives is not intended to preclude their use in the present silicone-based drilling fluids.

DESCRIPTION OF THE PREFERRED EMBODIMENTS

The drilling fluids of the present invention can be prepared in a manner typically used to prepare oil-based drilling fluids. In one representative procedure for producing an emulsion fluid, the desired quantity of base silicone and an emulsifier are mixed together, then other components, if any, are added sequentially with continuous mixing.

In an alternative embodiment of this invention, other base oils may be combined with silicone for the mixture to serve as the base liquid. In such combination, silicone should comprise at least about five percent of the continuous phase. An example of a suitable oil for combining with silicone as a base liquid in this invention is the synthetic hydrocarbon disclosed in U.S. Pat. No. 5,189,012 by Patel, et al., filed Jun. 8, 1990, and issued Feb. 23, 1993 which is incorporated herein by reference. Other hydrocarbons useful as base oils for drilling muds could alternatively be used for mixing with silicone to form a base liquid. Examples include oligomers of ethylene, propene, butene-1, isobutene, hexene, heptene, octene, nonene, decene, dodecene, mineral oils, petroleum oils and combinations of these. However, such other oils should preferably be non-toxic so as not to make the drilling fluid toxic.

As identified hereinbefore the synthetic hydrocarbons that are believed to be useful in the practice of this invention in combination with silicone are characterized by chain length and molecular weight parameters. Useful synthetic hydrocarbons are oligomers synthesized from one or more olefins containing a $C_2$ to $C_{14}$ chain length and wherein the oligomers have an average molecular weight of from 120 to 1000. In the preferred embodiments of this invention the synthetic hydrocarbons are oligomers synthesized from one or more olefins containing a $C_3$ to $C_{12}$ chain length and wherein the oligomers have an average molecular weight of from 160 to 800. In the most preferred embodiments of this invention the synthetic hydrocarbons are oligomers synthesized from one or more oligomers containing a $C_4$ to $C_{14}$ chain length and wherein the oligomers have an average molecular weight of 200 to 600.

In each instance the drilling fluid mixture must have performance and viscosity characteristics that permit functional utility as a drilling fluid. In its broadest form the synthetic hydrocarbon mixture should have a viscosity at 100° C. of from 1.0 to 6.0 centistokes, preferable a viscosity of from 1.5 to 4.0 centistokes and most preferably from 1.5 to 3.5 centistokes. The synthetic hydrocarbons may be hydrogenated (saturated), partially hydrogenated or non-hydrogenated.

The interfacial tension between oil and water is very high, so if the liquids are mixed together they mechanically separate immediately when the agitation ceases, to minimize the interfacial area. Lowering the interfacial tension with a surfactant enables one liquid to form a stable dispersion of fine droplets in the other. The lower the interfacial tension, the smaller the droplets and the more stable the emulsion. In most emulsions, oil is the dispersed phase and water is the continuous phase. However, in "invert emulsions" in which water is the dispersed phase, a suitable emulsion can be formed upon the use of a suitable emulsifier.

Whether an oil-in-water or water-in-oil emulsion is formed depends on the relative solubility of the emulsifier in the two phases. Thus, a preferentially water soluble surfactant, such as sodium oleate, will form an oil-in-water emulsion because it lowers the surface tension on the water side of the oil-water interface, and the interface curves toward the side with the greater surface tension, thereby forming an oil droplet enclosed by water. On the other hand, calcium and magnesium oleates are soluble in oil, but not in water, and thus form water-in-oil emulsions.

An invert water-in-silicone emulsion has silicone as the continuous phase. The compositions of this invention may comprise 100% silicone by volume of the total composition. Water, usually in the form of brine, is normally added in these compositions. Water may be added to the drilling fluid up to a volume of 70%. In more preferred embodiments water is added from 5% to 65% by volume and in the most preferred embodiment water is added from 10% to 60 by volume. These brines contain salts such as NaCl and/or $CaCl_2$ in varying mounts ranging up to 30% by weight. Other salts, such as formates, acetates, etc. may also be used in the product and process of this invention.

The compositions of one embodiment of this invention require emulsifiers to incorporate the brine or water phase into the silicone fluid continuous phase. Various emulsifiers are available for this application. The emulsifiers are chemical compounds which have both oleophilic arid hydrophilic parts. The emulsifiers that have demonstrated utility in the emulsions of this invention are fatty acids, soaps of fatty acids, amido-amines, polyamides, polyamines, oleate esters, such as sorbitan monoleate polyethoxylate, sorbitan dioleate polyethoxylate, imidazoline derivatives or alcohol derivatives, polyalkene oxide modified dimethyl siloxanes, and combinations or derivatives of the above. Blends of these materials as well as other emulsifiers can be used for this application. Versacoat and Versacoat NS are emulsifiers manufactured and distributed by M-I Drilling Fluids L.L.C., and Silwet L-7622™ is an emulsifier manufactured and distributed by Union Carbide that may be used in this invention.

The silicone based drilling fluid compositions of this invention may contain an additional chemical known as a wetting agent. Various wetting agents are available and can be included in the compositions. The wetting agents included, but not limited to the present invention, are fatty acids, crude tall oil, oxidized crude tall oil, organic phosphate esters, modified imidazole and amido-amine, alkyl aromatic sulfates and sulfonates and the like and combinations or derivatives of the above. Versawet and Versawet NS are wetting agents manufactured and distributed by M-I Drilling Fluids L.L.C. that may be used in this invention.

Organophilic clays, normally amine treated clays, are also used as viscosifiers in the silicone based drilling fluid composition of the present invention. Other viscosifiers, such as oil soluble polymers, polyamide resins, polycarboxylic acids and soaps can also be used. The amount of viscosifier used in the composition can vary depending upon the end use of the composition. However, normally about 0.1% to 10% by weight range are sufficient for most applications. VG-69 is an organoclay material distributed by M-I Drilling Fluids L.L.C., and Versa-HRP is a polyamide resin material manufactured and distributed by M-I Drilling Fluids L.L.C., that may be used in this invention.

The drilling fluid composition of this invention may optionally contain a weight material. The quantity depends upon the desired density and viscosity of the final composition. The preferred weight materials include, but are not limited to, barite, iron oxide, calcium carbonate and the like. The weight material is typically added to result in a drilling fluid density of up to 24 pounds per gallon, preferably up to 20 pounds per gallon and most preferably up to 19 pounds per gallon.

Finally, fluid loss control agents such as modified lignite, polymers, gilsomite, asphaltic material and modified starches and cellulose can be added to the drilling fluid system of this invention. For examples, Versa-Lig™ and Versa-Trol™ are fluid loss control agents distributed by M-I Drilling Fluids L.L.C.

The following examples illustrate the non-toxicity and performance characteristics of the silicone-based drilling fluids of this invention.

Dimethyl silicones acquired from the Union Carbide Company, and identified by letter and number tradenames, A-50 and L-45, below, were used. These silicones are further described in Union Carbide's booklet entitled, "Silicone Fluids, Emulsions and Antifoams" (1991). The tests were conducted in accordance with the procedures in API Bulletin RP 13 B-2, 1990, except where indicated otherwise. The following abbreviations are sometimes used in describing the results of experimentation:

"PV" is plastic viscosity which is one variable used in the calculation of viscosity characteristics of a drilling fluid measured in centi poise (cp) units.

"YP" is a yield point which is another variable used in the calculation of viscosity characteristics of drilling fluids measured in pounds per 100 feet square (lb/100 ft$^2$).

"GELS" is a measure of the suspending characteristics on the thixotropic properties of a drilling fluid measured in pounds per 100 feet square (lb/100 ft$^2$).

"ES" is the term used to indicate the stability of an emulsion measured in volts.

"HTHP" is the term used for high temperature high pressure fluid losses measured in milliliter (ml) according to API bulletin RP 13 B-2, 1990.

EXAMPLE 1

A drilling fluid of this invention was prepared with the following composition.

| CHEMICALS | WEIGHT IN GRAMS |
| --- | --- |
| Silicone A-50 | 160 |
| Silwet ® 7622 (surfactant available from Union Carbide) | 10 |
| Oleic Acid | 4 |
| Nova COAT ™ | 5 |
| NOVAWET ™ | 2 |
| Lime | 4 |
| CaCl$_2$ | 24 |
| Water | 56 |
| Barite | 354 |

NOVA COAT and NOVAWET are trademarks of M-I Drilling Fluids L.L.C.

This drilling fluid composition had the following physical properties before and after heat aging at 250° F. for 16 hours. Rheological properties were measured at room temperature.

|  | INITIAL | HEAT AGED |
| --- | --- | --- |
| PV | 53 | 55 |
| YP | 9 | 11 |
| GELS 10 sec/10 min. | 7/9 | 5/7 |
| E.S. | 2000+ | 2000+ |

The above data shows that an invert emulsion drilling fluid composition prepared with silicone fluid is stable.

EXAMPLE 2

The following chemicals were used in preparing a 14.4 ppg 70:30 silicone/water ratio invert silicone based drilling fluid of this invention.

| CHEMICALS | WEIGHT IN GRAMS |
| --- | --- |
| Silicone A-50 | 160 |
| CaCl$_2$ | 35.4 |
| SilWet L-7622 | 9 |
| Organophilic Clay | 3.0 |
| NOVAMUL ™ | 4.0 |
| Oleic Acid | 4.0 |
| Lime | 4.0 |
| Water | 82.6 |
| Barite | 300 |

NOVAMUL is a trademark of M-I Drilling Fluids L.L.C.

The following rheological data were obtained after heat aging at 150° F. for 16 hours and 250° F. for 16 hours. The rheological properties were measured at 120° F.

|  | H.A. 150° F. | H.A. 250° F. |
| --- | --- | --- |
| PV | 50 | 61 |
| YP | 54 | 30 |
| GELS 10'/10" | 22/26 | 15/19 |
| E.S. | 2000+ | 1059 |
| High temperature High pressure Filtrate | 10.2 ml | 11.5 ml |

The above data shows a stable invert emulsion drilling fluid composition of this invention can be prepared having good thixotropic properties.

EXAMPLE 3

The following composition shows the use of silicone fluid in combination with a synthetic polyalphaolefin hydrocarbon to prepare an invert emulsion drilling fluid of this invention.

| CHEMICALS | WEIGHT IN GRAMS |
| --- | --- |
| Silicone A-50 | 80 |
| Ethyl Flo-164 ™ | 80 |
| CaCl$_2$ | 35.4 |
| Water | 82.6 |
| Lime | 4.0 |
| SilWet ® L-7622 | 5.0 |
| Organophilic Clay | 3.0 |
| NOVAMUL ™ | 7.0 |
| Oleic Acid | 4.0 |
| Barite | 300 |

Ethyl Flo-164 is a tradename for a polyalphaolefin manufactured and distributed by Ethyl Corporation.

The following rheological properties were obtained on this drilling fluid composition after heat aging at 150° F. for 16 hours. The rheologies were measured at 120° F.

| PV | 51 |
| --- | --- |
| YP | 20 |
| GELS 10'/10" | 11/19 |
| E.S. | 900 |

The above data shows that a silicone based drilling fluid can be prepared in combination with hydrocarbons.

EXAMPLE 4

The following is the composition of a 10 ppg silicone based drilling fluid, with an 80:20 silicone/water ratio, using silicone fluid L-45 having 10 cSt viscosity.

| CHEMICALS | WEIGHT IN GRAMS |
|---|---|
| Silicone L-45, 10 cSt | 239 |
| CaCl$_2$ | 21.16 |
| Lime | 3 |
| VERSACOAT ® (emulsifier available from M-I Drilling Fluids) | 3 |
| VERSAWET ® (wetting agent available from M-I Drilling Fluids) | 3 |
| SilWet ® L-7622 (surfactant available from Union Carbide) | 6 |
| Organophilic Clay | 4 |
| Water | 61.79 |
| Barite | 84 |

The following rheological properties were obtained before and after heat aging. The rheologies were measured at room temperature.

| | INITIAL | HEAT AGING 150° F./16 HOURS | HEAT AGING 250° F./16 HOURS |
|---|---|---|---|
| PV | 27 | 25 | 21 |
| YP | 21 | 19 | 8 |
| GELS 10'/10" | 12/12 | 11/12 | 6/9 |
| E.S. | 673 | 903 | 510 |
| API Filtrate loss | — | — | 11.6 |

The above data shows an invert emulsion drilling fluid prepared with Silicone L-45 fluid is stable.

EXAMPLE 5

A silicone based invert emulsion 12.0 ppg drilling fluid having a 90:10 silicone/water ratio was prepared as follows.

| CHEMICALS | WEIGHT IN GRAMS |
|---|---|
| Silicone A-50 | 246.00 |
| CaCl$_2$ | 9.69 |
| Water | 28.3 |
| Organophilic Clay | 6.0 |
| Versa HRP ™ | 2.0 |
| Lime | 3.0 |
| VERSACOAT ® | 3.0 |
| VERSA-WET ® | 3.0 |
| Barite | 205.0 |

VERSACOAT, VERSAWET and Versa-HRP are trademarks of M-I Drilling Fluids L.L.C.

The following rheological properties were obtained on this drilling fluid composition before and after heat aging. The theologies were measured at room temperature.

| | INITIAL | HEAT AGING 150° F./16 HOURS | HEAT AGING 250° F./16 HOURS |
|---|---|---|---|
| PV | 22 | 23 | 22 |
| YP | 5 | 4 | 3 |
| GELS 10'/10" | 7/8 | 6/10 | 5/7 |
| E.S. | 571 | 993 | 463 |
| API Filtrate loss | — | — | 7.9 |

The above data shows that a high silicone fluid/water ratio drilling fluid can be prepared with silicone fluid.

EXAMPLE 6

To determine the toxicity of the dimethyl silicone based drilling fluids of this invention, tests were conducted on three drilling fluid samples following the standard U.S. Environmental Protection Agency protocol set forth in Appendix 3 of "Effluent Limitation Guidelines and New Source Performantic Standards: Drilling Fluid Toxicity Test," *Federal Register* Vol. 50, No. 165, 34631–34636. The tests comprised 96-hour range-finder bioassays conducted on a suspended particulate phase ("SPP") of each sample using *Mysidopsis bahia*, also called mysid shrimp. In these tests, SPP is the unfiltered supernatant extracted from a 1:9 mixture of the drilling fluid and seawater which was allowed to settle for one hour. LC$_{50}$ is the concentration or the quantity of a toxic substance in the surrounding water that produces 50 % mortality in the test species. The greater the 96-hour LC$_{50}$ value, the lower the toxicity of the drilling fluid sample being tested. The results are presented below.

Bioassay Results-Sample 1 (AP SF-200 10% in Generic Mud #7)

AP SF-200 is the silicone fluid L-45 (200 cst) obtained from Union Carbide.

A 96-hour LC$_{50}$ of greater than 500,000 ppm was determined for drilling fluid sample 1. The highest concentration (500,000 ppm) of SPP tested had an observed 80% survival. The negative control (20 mysids in seawater) showed 100% survivability.

Bioassay Results-Sample 2 (2% AP-SF-A-50 in Generic Mud #7)

AP-SF-A-50 is the silicone fluid A-50 obtained from Union Carbide.

A 96-hour LC-50 of greater than 1,000,000 ppm was determined for drilling fluid sample 2. The negative control (60 mysids in seawater) showed 97% survivability. A 95% confidence interval could not be established for this data set.

Bioassay Results-Sample 3 (AP-L45-10 SF 10% in Generic Mud #7)

AP-L45-10 SF is the silicone fluid L-45 (10 cst) obtained from Union Carbide.

A 96-hour LC$_{50}$ of greater than 500,000 was determined for drilling fluid sample 3. The highest concentration (500,000 ppm) of SPP tested had an observed 100% survival. The negative control (20 mysids in seawater) showed 100% survivability.

Conclusions

The results of these bioassays indicate that the 96-hour LC$_{50}$ for each of these laboratory-prepared drilling fluid samples was greater (i.e., less toxic) than the 30,000 ppm toxicity limitation set b the Gulf of Mexico NPDES permit. That is, the drilling fluid samples of this invention show substantial non-toxicity.

Although there has been described above a substantially non-toxic silicone-based drilling fluid in accordance with the present invention for purposes of illustrating the manner in which the invention can be used to advantage, it is to be understood that the invention is not limited thereto. Accordingly, any and all modifications and variations which occur to those skilled in the art are to be considered to be within the scope and spirit of the invention as defined in the following claims.

What is claimed is:

1. A drilling fluid comprising a continuous phase and an aqueous internal phase, wherein the continuous phase of said drilling fluid comprises at least about five percent of a dimethylsiloxane polymer fluid having a viscosity in the range of about 2 to 1000 centistokes at 25° Centigrade, and an emulsifier, said emulsifier is selected from the group consisting of; fatty acids, soaps of fatty acids, amido-amines, polyamides, polyamines, oleate esters, imidazolines, alcohols, polyalkylene oxides dimethyl polysiloxanes, and combinations thereof.

2. The drilling fluid of claim 1, further comprising water or brine emulsified into the continuous phase.

3. The drilling fluid of claim 1, further comprising at least one additive selected from the group consisting of viscosifiers, weighting agents, oil wetting agents, densifiers, and fluid loss preventing agents.

4. The drilling fluid of claim 3 wherein the dimethylsiloxane polymer fluid comprises at least about 25 volume percent of the emulsion.

5. An improved continuous phase for a drilling fluid, where the improvement comprises said continuous phase comprising at least about five percent of a dimethylsiloxane polymer fluid, said fluid having a viscosity in the range of about 2 to 1000 centistokes at 25° Centigrade, and an emulsifier, said emulsifier is selected from the group consisting of; fatty acids, soaps of fatty acids, amido-amines, polyamides, polyamines, oleate esters, imidazolines, alcohols, polyalkylene oxides dimethyl polysiloxanes, and combinations thereof.

6. The improved continuous phase for the drilling fluid of claim 5 wherein the dimethylsiloxane polymer fluid has the formula —$(CH_3)_2SiO_2)_x$— wherein x has a value of 2 to several hundred wherein x is sufficient to achieve said viscosity and said dimethylsiloxane polymer fluid is linear or cyclic in structure.

7. The improved continuous phase for a drilling fluid of claim 5 wherein said drilling fluid contains a weight material selected from the group consisting of barite, iron oxide, calcium carbonate and combinations thereof.

8. The improved continuous phase for a drilling fluid of claim 5 further comprising a hydrocrarbon oil.

9. The improved continuous phase for a drilling fluid of claim 8 wherein said hydrocarbons are selected from the group consisting of oligomers of: ethylene, propene, butene-1, isobutene, hexene, heptene, octene, nonene, decene, dodecene, mineral oils, petroleum oils, and combinations thereof.

10. The improved continuous phase for a drilling fluid of claim 8 wherein said hydrocarbon is a polyalphaolephin.

11. A silicone-based drilling fluid comprising:
    (a) a continuous phase, said continuous phase comprising at least about five percent of a dimethylsiloxane polymer fluid, said fluid having a viscosity in the range of about 2 to 1000 centistokes at 250 Centigrade;
    (b) a weighting material;
    (c) water; and
    (d) an emulsifier, said emulsifier is selected from the group consisting of: fatty acids, soaps of fatty acids, amido-amines, polyamides, polyamines, oleate esters, imidazolines, alcohols, polyalkylene oxides dimethyl polysiloxanes, and combinations thereof.

12. The silicone-based drilling fluid of claim 11 wherein said drilling fluid contains up to about 75 percent water by volume.

13. The silicone-based drilling fluid of claim 11 further comprising a wetting agent.

14. The silicone-based drilling fluid of claim 13 wherein said wetting agent is selected from the group consisting of: crude tall oil, oxidized crude tall oil, organic phosphate esters, imidazolines, alkyl aromatic sulfonates and combinations thereof.

15. The silicone-based drilling fluid of claim 11 further comprising a viscosifier.

16. The silicone-based drilling fluid of claim 15 wherein said viscosifier is selected from the group consisting of: organophilic clays, oil soluble polymers, polycarboxylic acid, soaps and combinations thereof.

17. The silicone-based drilling fluid of claim 11 wherein said weight material is selected from the group consisting of barite, iron oxide, calcium carbonate and combinations thereof.

18. The drilling fluid of claim 11 wherein said fluid is substantially non-toxic to marine life.

* * * * *

UNITED STATES PATENT AND TRADEMARK OFFICE
CERTIFICATE OF CORRECTION

PATENT NO. : 5,707,939

DATED : January 13, 1998

INVENTOR(S) : Patel

It is certified that error appears in the above-identified patent and that said Letters Patent is hereby corrected as shown below:

Column 12, line 19, delete "250" and insert therefor --25° --.

Signed and Sealed this

Seventh Day of April, 1998

Attest:

BRUCE LEHMAN

*Attesting Officer*  *Commissioner of Patents and Trademarks*